UNITED STATES PATENT OFFICE.

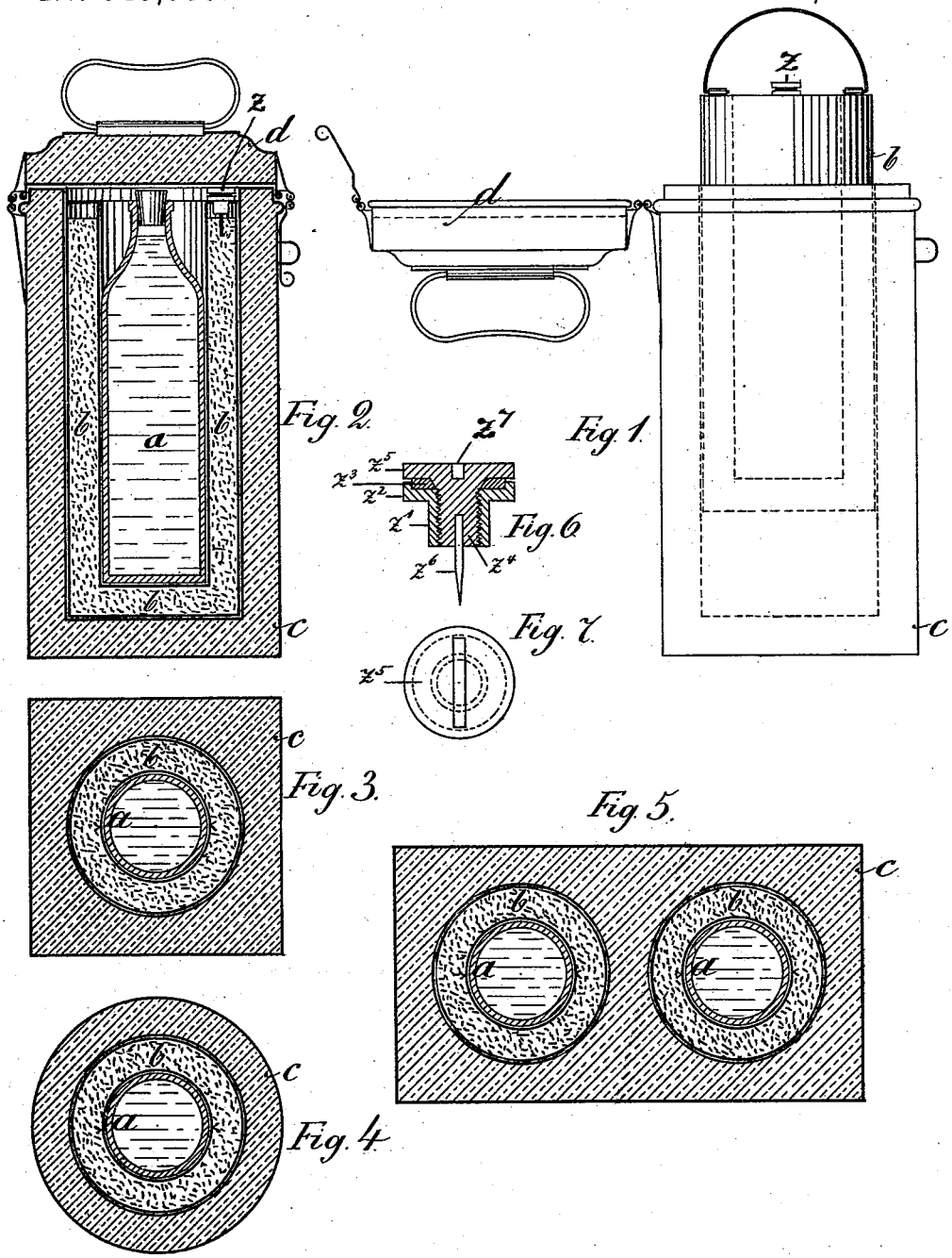

CARL CRONENBERG AND STEFAN MARIA BOGUMIL VON SZCZAWINSKI, OF ELBERFELD, GERMANY.

DEVICE FOR RETAINING HEAT IN FOODS, &c.

SPECIFICATION forming part of Letters Patent No. 549,959, dated November 19, 1895.

Application filed November 27, 1894. Serial No. 530,200. (No model.) Patented in Belgium June 26, 1894, No. 110,702, and in England July 28, 1894, No. 12,585.

*To all whom it may concern:*

Be it known that we, CARL CRONENBERG and STEFAN MARIA BOGUMIL VON SZCZAWINSKI, subjects of the Emperor of Germany, and residents of Elberfeld, in the Empire of Germany, have invented an Improved Device for Retaining Heat in Foods or other Matters, (for which we have obtained patents in Belgium, No. 110,702, dated June 26, 1894, and in Great Britain and Ireland, No. 12,585, dated July 28, 1894,) of which the following is a specification.

The object of this invention is to provide means for imparting heat to or preserving the heat or temperature of foods or beverages or other matters that may be inserted into the device constituting this invention.

Reference being made to the annexed sheet of drawings, Figure 1 illustrates the improved device in side elevation with its cover open and its inner receptacle partially lifted out. Fig. 2 is a vertical section through the device closed and shows a bottle of liquid—for instance, milk—placed therein. Fig. 3 is a horizontal section through the device when the outer vessel thereof is of four-sided prismatic form. Fig. 4 is a horizontal section thereof when the outer vessel is cylindrical exteriorly. Fig. 5 is a cross-section showing the outer vessel with two cavities to hold two inner vessels, into which bottles or receptacles for preserving the temperature of their contents may be placed. Fig. 6 is a section through a stopper and its bushing, and Fig. 7 is a plan of said stopper employed to close the space in the hollow wall of the interior vessel.

The improved device consists of an outer vessel $c$, with its lid $d$, made of sheet metal, with hollow walls, the space within which is filled with any suitable bad conductor of heat, such as slag-wool, silk refuse, felt, or the like. Such vessel may have any desired exterior form and may be made with one or more cavities formed by its inner walls to receive one or more inner vessels $b$, also made with hollow walls of sheet metal, the interior space of which is filled with a crystallized salt having its melting-point below the boiling-point of water—namely, 100° centigrade—but preferably not far below that temperature. The interior of vessel $b$ may be of any desirable shape—for instance, in the example illustrated it is cylindrical—to nicely receive a bottle $a$ for liquids.

The operation of this invention is as follows: The vessel $b$ is lifted out and immersed in hot water, as the preferable way of heating it, whereby the salt in its hollow walls absorbs a large quantity of heat in rising to the temperature of its surroundings, and especially in passing to the liquid state. The vessel is then placed inside the vessel $c$, and the article to be kept warm is placed in the vessel $b$ and the lid $d$ is closed. The hinderance to escape of heat presented by the bad heat-conductor in the walls of vessel $c$, coupled with the property of the salt when crystallizing to give off a large quantity of latent heat without fall of temperature below its crystallizing or solidifying point renders this device capable of preserving the heat of articles placed within it for comparatively lengthy periods.

For filling the walls of vessel $b$ we prefer to use acetate of soda, $(NaC_2H_3O_2.3Aq.)$ Inasmuch as in practice it is found desirable to have means for setting up the action of crystallization—that is to say, for inducing a commencement of such action, since otherwise the liquid may cool to a point more or less below its true solidifying-point before passing into the crystalline state—we provide a stopper $z^4$, having projecting from it a metal rod or needle $z^6$. This stopper is screwed into a bushing $z'$, having a flange $z^2$ firmly fixed in a suitable position in the wall of vessel $b$—for instance, as shown in Fig. 2—so that when the stopper $z^4$ is screwed therein its needle $z^6$ will be in contact with the salt. A rubber or other washer $z^3$ secures air-tight closure for the stopper, and the latter is provided with a slit $z^7$ in its head wide enough to enable it to receive the edge of a coin, so that it can be conveniently opened thereby when a screwdriver is not at hand. To induce the commencement of the process of crystallization, this stopper is unscrewed and exposed to the air. The cooling of the pin $z^6$ crystallizes the liquid salt with which the pin is covered, and on reinsertion of the stopper the crystals so formed cause a commencement of crystallization throughout the remainder of the salt.

We claim as our invention—

A hollow walled vessel having the space in its walls filled with a salt soluble in its water of crystallization below 100° centigrade, a stopper for closing the orifice of said space airtight and a needle on said stopper adapted to have its point immersed in the salt or its solution for the purpose set forth.

In witness whereof we have signed this specification in presence of two witnesses.

CARL CRONENBERG.
STEFAN MARIA BOGUMIL VON SZCZAWINSKI.

Witnesses:
R. E. JAHN,
F. H. STRAUSS.